United States Patent
Li

(10) Patent No.: US 12,476,696 B2
(45) Date of Patent: Nov. 18, 2025

(54) COMMUNICATION METHOD, COMMUNICATION APPARATUS, AND STORAGE MEDIUM

(71) Applicant: Beijing Xiaomi Mobile Software Co., Ltd., Beijing (CN)

(72) Inventor: Yuanyuan Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 390 days.

(21) Appl. No.: 18/002,220

(22) PCT Filed: Jul. 13, 2020

(86) PCT No.: PCT/CN2020/101698
§ 371 (c)(1),
(2) Date: Dec. 16, 2022

(87) PCT Pub. No.: WO2022/011510
PCT Pub. Date: Jan. 20, 2022

(65) Prior Publication Data
US 2023/0344509 A1  Oct. 26, 2023

(51) Int. Cl.
*H04B 7/185* (2006.01)
*H04B 7/08* (2006.01)

(52) U.S. Cl.
CPC ......... *H04B 7/18513* (2013.01); *H04B 7/088* (2013.01)

(58) Field of Classification Search
CPC ............ H04B 7/18513; H04B 7/18515; H04B 7/086; H04B 7/0617; H04B 7/2041; H04B 7/088; H04B 10/118; H04B 7/0408
See application file for complete search history.

(56) References Cited

U.S. PATENT DOCUMENTS

| 5,736,959 A | * | 4/1998 | Patterson | H04B 7/18589 |
| | | | | 342/372 |
| 6,075,484 A | * | 6/2000 | Daniel | G01S 3/74 |
| | | | | 342/372 |
| 2021/0208286 A1 | * | 7/2021 | Turpin | G01S 3/74 |

FOREIGN PATENT DOCUMENTS

| CN | 106025482 B | * | 6/2018 |
| CN | 110380770 A | | 10/2019 |
| CN | 111371486 A | | 7/2020 |
| JP | H1174831 A | * | 3/1999 |

OTHER PUBLICATIONS

International Search Report and Written Opinion of International Application No. PCT/CN2020/101698, mailed Mar. 25, 2021, 15 pages.

* cited by examiner

*Primary Examiner* — Keith Ferguson
(74) *Attorney, Agent, or Firm* — Finnegan, Henderson, Farabow, Garrett & Dunner, L.L.P.

(57) ABSTRACT

The present disclosure relates to a communication method, a communication apparatus, and a storage medium. The communication method includes: determining a direction of arrival (DoA) of a satellite aligned with a beam receiving end; and sending a beam based on the DoA. With the communication method according to the present disclosure, wireless network communication has no geographical restrictions, and communication signals thereof can reach any position, achieving coverage of a global wireless network.

14 Claims, 3 Drawing Sheets

COMMUNICATION METHOD, COMMUNICATION APPARATUS, AND STORAGE MEDIUM

CROSS-REFERENCE TO RELATED APPLICATION

This application is a US national stage application of International Application No. PCT/CN2020/101698, filed on Jul. 13, 2020, the entire content of which is incorporated herein by reference.

FIELD

The present disclosure relates to the technical field of communication, and in particular, to a communication method, a communication apparatus, and a storage medium.

BACKGROUND

A network communication technology has been used in daily life, but coverage of a current terrestrial network has not reached extensive global coverage. For example, for civil aircrafts and private aircrafts, at present, in-flight Internet access requirements of customers of the civil aircrafts in the world cannot be effectively solved, let alone popularized. Similar problems also involve ocean-going vessels, offshore cruise ships, and a variety of commercially operated small- and medium-sized cruise ships. Broadband Internet access requirements in vessels and cruise ships in the sea, especially in an open sea voyage, have been unmet. Even some remote regions for scientific research and tourism cannot provide wireless network services through the terrestrial network due to interaction between a limited number of terminals and deployment costs of the terrestrial network.

At present, with the mass production of miniaturized communication satellites and the continuous maturity of rocket launch technologies, deployment costs of the satellites have been greatly reduced. In the related art, mobility of the communication satellites may provide more extensive satellite network coverage for space-sky-earth-sea integration. Therefore, it is a current research hotspot to solve the above network coverage problem through coverage of low-orbit satellites.

SUMMARY

In order to overcome the problems existing in the related art, the present disclosure provides a communication method, a communication apparatus, and a storage medium.

According to a first aspect of an embodiment of the present disclosure, a communication method is provided, including:
determining a direction of arrival (DoA) of a satellite aligned with a beam receiving end; and sending a beam based on the DoA.

According to a second aspect of an embodiment of the present disclosure, a communication apparatus is provided, including:
a processor; and a memory configured to store processor-executable instructions; wherein the processor is configured to determine a direction of arrival (DoA) of a satellite aligned with a beam receiving end; and send a beam based on the DoA.

According to a third aspect of an embodiment of the present disclosure, a non-transitory computer-readable storage medium is provided, wherein instructions in the storage medium, when executed by a processor of a mobile terminal, cause the mobile terminal to perform a communication method including:
determining a direction of arrival (DoA) of a satellite aligned with a beam receiving end; and sending a beam based on the DoA.

The technical solutions according to the embodiments of the present disclosure may include the following beneficial effects. A DoA of a beam of a satellite aligned with a receiving end is determined, and a beam sent by the satellite is kept always aligned with the DoA based on the determined DoA. Further, the beam receiving end can always receive a beam sent by the satellite, so that wireless network communication has no geographical restrictions, and communication signals thereof can reach any position, thereby achieving coverage of a global wireless network and solving the problem that some special regions are not covered by a wireless network.

It is to be understood that the general description above and the detailed description in the following are merely exemplary and illustrative, and cannot limit the present disclosure.

BRIEF DESCRIPTION OF THE DRAWINGS

The accompanying drawings herein, which are incorporated in and constitute a part of the specification, illustrate embodiments consistent with the present disclosure and, together with the specification, serve to explain the principles of the present disclosure.

DETAILED DESCRIPTION

Figure 1:
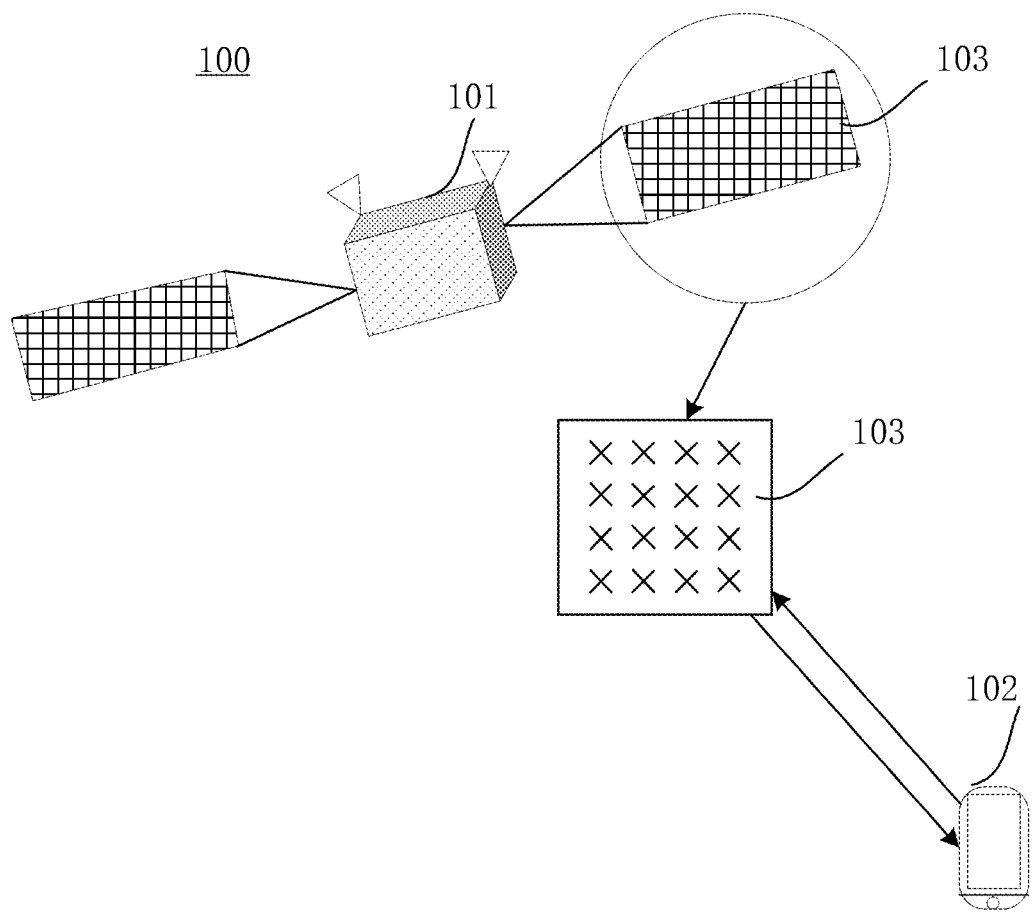
FIG. 1 is a schematic diagram of a communication system of a satellite and a beam receiving end to which a communication method is applied according to an exemplary embodiment.

Exemplary embodiments will be described in detail herein, examples of which are shown in the accompanying drawings. When the following description relates to the accompanying drawings, unless otherwise specified, identical numbers in different accompanying drawings denote identical or similar elements. Examples described in the following exemplary embodiments do not represent all examples consistent with the present disclosure. Instead, they are merely examples of apparatuses and methods consistent with some aspects related to the present disclosure as recited in the appended claims.

In the middle and late stage of development of mobile communication, in order to expand system capacity and support more terminals, a frequency utilization rate is increased by shrinking a cell range and reducing a frequency reuse factor. A method of cell division or sectorization is generally adopted. However, this is followed by increased interference. Computer communication interfaces (CCIs) and multiple access interference (MAI), which were originally effectively reduced by distance (indeed by means of path loss), have increased proportionally. Use of array antennas in communication systems can increase channel capacity and spectrum utilization, expand a coverage area, reduce multipath fading and co-channel interference, and reduce a bit error rate. According to the related art, the use of antenna arrays in communication systems can increase channel capacity and spectrum utilization, expand a coverage area, reduce multipath fading and co-channel interference, and reduce a bit error rate. At the same time, by using a beamforming technology, a difference between a useful signal and an interfering signal in spatial orientation can be fully utilized to select an appropriate combined weight value to form an optimal antenna receiving mode. By using the beamforming technology, a difference between a useful signal and an interfering signal in spatial orientation can be fully utilized to select an appropriate combined weight value to form an optimal antenna receiving mode, which means that a main lobe is aligned with the useful signal and a low-gain side lobe or null steering is aligned with a dominant interfering signal, so as to more effectively suppress interference, reduce the frequency reuse factor more proportionally, and support more terminals simultaneously.

It is to be noted that, since directivity of a single antenna is limited, two or more single antennas operating at a same frequency are fed and arranged in space according to a requirement to form an antenna array, also called an aerial array. An antenna radiation unit constituting the aerial array is called an array element.

Beamforming is a signal preprocessing technology based on an antenna array, an example of which is to adjust amplitude and a phase of each antenna transceiver unit, so that transmitted/received signals of the antenna array in a specific direction are coherently superimposed, while signals in other directions cancel each other out. Further, by adjusting a weighting coefficient of each antenna element in the antenna array, beamforming can produce a directional beam, so as to obtain an obvious array gain and achieve effects of expanding a network coverage area and improving edge throughput and interference suppression.

In a mobile communication network of the related art, a network device such as a base station is fixed on the ground. If a position of a terminal changes relative to the network device, only a coverage area of the network device where the terminal is located is required to be determined. An antenna array mounted to the network device in the coverage area where the terminal is located produces a directional beam and aligns the beam with the terminal to realize communication. Since the network device is fixed on the ground, global coverage of the network cannot be realized through the related art. If the terminal takes a civil aircraft or a private aircraft, the terminal cannot conduct communication normally over the network. Moreover, ocean-going vessels, offshore cruise ships, and even a variety of commercially operated small- and medium-sized cruise ships in a sea area range cannot conduct communication normally over the network due to the network device such as the base station Even in some remote regions for scientific research and tourism, due to a small number of terminals, establishment of a ground base station is costly, so a coverage area of the base station is small, which cannot guarantee full network coverage in the remote regions.

In order to solve the problem of incomplete network coverage involved in the above embodiments, the present disclosure provides a communication method According to the above embodiments, beamforming is closely related to space division multiple access (SDMA) due to spatial selectivity brought about by beamforming. SDMA is a satellite communication mode, which has achieved an effect of reducing system costs by using the directivity of the antenna array to optimize use of radio frequency domains. SDMA uses space segmentation to form different channels and realizes the use of a plurality of antennas on a satellite to form an antenna array. Beams produced by the antenna array strike different regions on the earth's surface. Antennas in the antenna array may not interfere with each other even if operating at a same frequency at a same time. Therefore, the communication method according to the present disclosure is to ensure, based on a coverage area of a communication network provided by a satellite, that a satellite beam is aligned with a beam receiving end within the coverage area of the satellite communication network.

An example of the communication method according to the present disclosure is described by taking a low-orbit satellite as an example in the present disclosure. The low-orbit satellite orbits the earth and moves according to a specified motion trajectory, whose position relative to the ground is constantly changing. In other words, a communication coverage area provided by each individual satellite varies as the position of the satellite relative to the ground changes. During communication between a satellite and a terminal, based on beamforming of the satellite, directions and characteristics of various links between the satellite and the beam receiving end can be acquired through an antenna array mounted on a side of a mobile wireless access satellite and through a set of fixed antenna units with programmable electronic phase relationships. It is to be further understood that a radio signal is directed in a specific direction to produce a directional beam. The communication method according to the present disclosure may be applied to the schematic diagram of a communication system 100 of a satellite 101 and a beam receiving end 102 shown in FIG. 1. As shown in FIG. 1, an antenna array 103 in FIG. 1 is arranged on the satellite 101, and the antenna array 103 mounted on the satellite 101 is partially enlarged based on FIG. 1. Within a coverage range of a satellite beam, a direction in which a main beam of the antenna array 103 is aligned with an arrival direction of a signal of the beam receiving end 102 is called a DoA. A side lobe or null steering thereof is aligned with an arrival direction of an interfering signal to achieve a purpose of fully and efficiently utilizing a mobile terminal signal and eliminating or suppressing the interfering signal.

It is to be noted that the schematic diagram of the communication system 100 of the satellite 101 and the beam receiving end 102 shown in FIG. 1 is merely illustrative. The beam receiving end may also include other devices, and a number of beam receiving ends included in the communication system of the satellite and the beam receiving end is not limited in the embodiments of the present disclosure.

Further, the beam receiving end as referred to in the present disclosure may be a handheld device, a vehicle-mounted device, or the like with a wireless connection function. At present, some examples of the beam receiving end are: a Mobile Phone, a pocket personal computer (PPC), a palm computer, a personal digital assistant (PDA), a laptop computer, a tablet computer, a wearable device, a vehicle-mounted device, and so on. In addition, in the case of a vehicle to everything (V2X) communication system, the terminal device may also be a vehicle-mounted device. It should be understood that a specific technology and a specific device form adopted by the beam receiving end are not limited in the embodiments of the present disclosure.

In conjunction with the application environment as referred to in the above embodiment, with the communication method according to the embodiment of the present disclosure, a beam of the satellite is kept always aligned with the beam receiving end, and the beam is sent based on a DoA of the satellite aligned with the beam receiving end, which can realize global network coverage and prevent the problem that the ground base station cannot provide wireless network services in some remote regions, sea areas or even in the sky due to geographical restrictions. Further, network coverage is realized without geographical restrictions, which can ensure an effect that the wireless network services can be enjoyed at any position.

Figure 2:
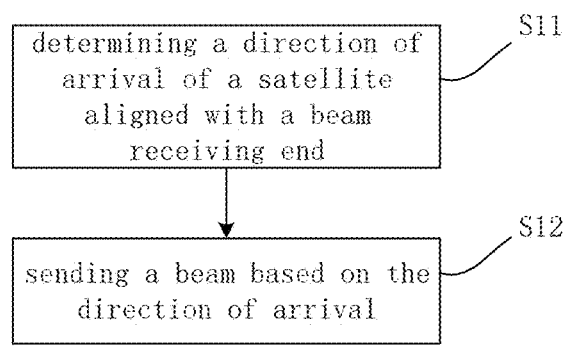
FIG. 2 is a flowchart of a communication method according to an exemplary embodiment.

FIG. 2 is a flowchart of a communication method according to an exemplary embodiment. As shown in FIG. 2, the communication method is used in a terminal, including the following steps:

Step S11: determining a DoA of a satellite aligned with a beam receiving end.

In this embodiment of the present disclosure, through a beamforming technology, a weighting coefficient of each antenna element in the antenna array mounted on the satellite is adjusted to produce a directional beam. The directional beam has a DoA aligned with the beam receiving end.

In an embodiment, the DoA of the directional beam may be determined based on directions and channel characteristics of various links between the satellite and the beam receiving end.

Step S12: sending a beam based on the DoA.

In an exemplary embodiment of the present disclosure, the sending of the beam in the DoA of the satellite aligned with the beam receiving end ensures continuous communication between the satellite and the beam receiving end, which provides the possibility for realizing wireless network communication without geographical restrictions.

In the embodiment of the present disclosure, an implementation process of determining the DoA of the satellite aligned with the beam receiving end as referred to in this embodiment of the present disclosure will be described below in conjunction with practical application.

Since the position of the satellite relative to the ground is constantly changing, the coverage area of the beam emitted by the satellite is constantly changing as the position moves. In an embodiment, the position of the satellite may be offset within a specified time based on movement of the satellite. In the present disclosure, to distinguish the descriptions of the position of the satellite, a relative position of the satellite with respect to the earth's surface at the current time is referred to as a first position. Based on the first position, the satellite determines the directional beam based on the beamforming technology, and further determines a DoA of the directional beam based on the first position. In the present disclosure, for ease of description, the DoA of the directional beam determined by the satellite based on the first position is referred to as a first DoA.

In an example of an exemplary embodiment of the present disclosure, the DoA of the satellite aligned with the beam receiving end is determined based on position offset of the satellite relative to the first position within a specified time and the first DoA. The beam is sent based on the DoA of the satellite aligned with the beam receiving end, so that the beam sent by the satellite is always aligned with the beam receiving end, which ensures continuity of communication at the beam receiving end.

In an example of an exemplary embodiment of the present disclosure, a movement speed of the satellite and/or an attitude of the satellite are/is acquired, and the position offset of the satellite relative to the first position within the specified time is determined based on the movement speed of the satellite and/or the attitude of the satellite acquired. The specified time may be determined according to a time difference between sending and receiving of a signal after the satellite determines the first DoA based on the first position. For example, if there is a time difference in milliseconds between the satellite determining the first DoA and receiving the signal sent by the beam receiving end and the time difference is 1 millisecond, 1 millisecond is determined as the specified time. It may be understood that, in this embodiment of the present disclosure, the time unit of the position offset and the specified time may be determined based on an actual requirement.

In the above example of determining the position offset of the satellite, factors such as changes in the movement speed and the attitude of the satellite are added to the process of determining the position offset of the satellite, which ensures accuracy of the DoA of the satellite aligned with the beam receiving end.

In an exemplary embodiment of the present disclosure, the satellite is equipped with a large-scale antenna array and generates a beam aggregation capable of covering the beam receiving end through the beamforming technology. The satellite communicates synchronously with the beam receiving end. In a channel uplink transmission phase, the beam receiving end sends a pilot sequence to the satellite.

The satellite determines, according to statistics on channels of an uplink sent by the beam receiving end, a beamforming weighting factor of a downlink of the beam receiving end sent by the satellite. The channel is configured to describe a signal relationship between the beam receiving end and the satellite. The satellite may determine the first DoA based on a channel state of the beam receiving end. The channel state of the beam receiving end may be understood as a channel state of an uplink through which the beam receiving end transmits signals to the satellite.

In an exemplary embodiment of the present disclosure, the satellite may determine the channel state of the beam receiving end according to a pilot sequence. In an example, the channel state of the beam receiving end is determined based on a pilot sequence of the beam receiving end. The satellite obtains channel information by generalized least squares between a received pilot sequence and a known pilot sequence. Further, the satellite performs noise suppression processing on the obtained channel information, and decomposes the channel information after noise suppression processing, to finally obtain the first DoA.

In an exemplary embodiment of the present disclosure, the pilot sequence of the beam receiving end may be designed to assist the satellite in determining the first DoA. A number and a length of the pilot sequence of the terminal may be determined according to capacity of the satellite.

In an example of the embodiment of the present disclosure, the beam receiving end sends a received DoA of the satellite to the satellite to assist the satellite in determining the first DoA based on the DoA sent by the beam receiving end. The satellite determines the first DoA based on the DoA sent by the beam receiving end, so as to determine a DoA aligned with the beam receiving end. That is, the first DoA is determined based on the DoA sent by the beam receiving end.

In the present disclosure, for ease of description, a DoA of a downlink received by the beam receiving end based on uplink feedback is referred to as a second DoA. The satellite determines, based on the second DoA fed back by the beam receiving end, an antenna array mounted on the satellite to respond, and then determines the first DoA.

In the embodiment of the present disclosure, the DoA determined by the satellite may be for a specified beam receiving end, or it may also be understood as that the satellite adjusts a DoA for the specified beam receiving end to determine a DoA aligned with the specified beam receiving end. For example, the DoA determined by the satellite is for a specified terminal. The satellite determines a beamforming weighting factor of a downlink according to statistics on channels of an uplink of the terminal. A channel state of the uplink may be determined according to a pilot sequence. That is, H is obtained by generalized least squares between a received pilot sequence and a known sent pilot sequence, noise suppression processing is performed on H, and His decomposed to obtain the DoA. In an example, a user-level pilot sequence (pilot sequence of a specified terminal) is designed to assist the satellite in determining the DoA. A number and a length of the pilot sequence are designed according to specific satellite communication capacity. Alternatively, the terminal feeds a received DoA of the downlink back to the uplink to assist the satellite in determining an antenna array response. It may be understood that the satellite also needs to take a movement speed, a relative position, and the like into account. The satellite always keeps the beam aligned with the specified terminal within a coverage area.

In an example, in the embodiment of the present disclosure, the DoA determined by the satellite may be aligned with one or more beam receiving end clusters. The beam receiving end clusters each include one or more beam receiving ends. That is, the satellite may adjust the DoA for the one or more beam receiving ends, so that the DoA of the satellite is aligned with the one or more beam receiving ends.

In an exemplary embodiment of the present disclosure, the beam receiving end cluster may be determined based on a coverage angle of the satellite. For example, the beam receiving end cluster may be determined by a geographical position, and the beam receiving ends under a coverage angle of the satellite belong to a same beam receiving end cluster.

In the embodiment of the present disclosure, the coverage angle of the satellite is determined based on changes in the movement speed of the satellite and the attitude of the satellite, the beam receiving ends under the coverage angle of the satellite are determined, and then the beam receiving end cluster is determined. Further, in the present disclosure, for ease of description, the coverage angle of the satellite determined currently based on the channel information of the uplink is referred to as a first coverage angle. The satellite determines the time of the first coverage angle of the satellite according to the channel information. After determining the first coverage angle, the satellite determines a second coverage angle based on the time of receiving a signal sent by the beam receiving end cluster, and then obtains a range of the beam receiving end cluster. The second coverage angle is next coverage angle of the satellite determined relative to the first coverage angle.

Changes in the movement speed of the satellite and the attitude of the satellite are taken as factors to determine the coverage angle of the satellite in the determination of the coverage angle of the satellite, which reduces an error between an actual beamforming factor of the beam receiving end cluster and a determined beamforming factor, so as to make the obtained range of the beam receiving end cluster more accurate, preventing the problem that there are beam receiving ends in the beam receiving end cluster that fail to receive the beam.

The satellite determines an antenna beamforming factor of the beam receiving end cluster according to statistics on channels of uplinks of each beam receiving end in the beam receiving end cluster, and determines a DoA aligned with the beam receiving end cluster.

In an example of an exemplary embodiment of the present disclosure, the statistics on channels of uplinks of each beam receiving end in the beam receiving end cluster are determined by a pilot sequence of the beam receiving end cluster.

In an exemplary embodiment of the present disclosure, the pilot sequence of each beam receiving end in the beam receiving end cluster is orthogonal to each other. The use of the orthogonal pilot sequences by the beam receiving end can effectively prevent unwanted interfering signals.

In an example of an exemplary embodiment of the present disclosure, in the example of the present disclosure, a reference pilot sequence is designed for the beam receiving end cluster, and the reference pilot sequence of the beam receiving end cluster is determined based on a number of the beam receiving end clusters.

The satellite obtains channel information by doing a division based on the received reference pilot sequence of the beam receiving end cluster and the known pilot sequence. The satellite performs noise suppression processing on the obtained channel information, and decomposes the channel information after noise suppression processing, to finally obtain a reference DoA of the beam receiving end cluster.

The pilot sequences of each beam receiving end in a same beam receiving end cluster may be obtained by cyclic shift based on the reference pilot sequence of the beam receiving end cluster to which the beam receiving ends belong.

In another example, for the beam receiving end and the beam receiving end cluster, the first DoA thereof may also be determined through the following examples.

In an example of an exemplary embodiment of the present disclosure, a manner of dividing the beam receiving end cluster may include: determining a coverage angle of the satellite according to a geographical position of the earth and the coverage area of the satellite. Based on the determined coverage angle of the satellite, it is determined that beam receiving ends under the coverage angle belong to a same beam receiving end cluster.

In an example of an exemplary embodiment of the present disclosure, beams are kept always aligned with the beam receiving end cluster within the coverage area of the satellite, and the beam receiving end cluster, after receiving the beams sent by the satellite, may allocate the beams according to each beam receiving end in the beam receiving end cluster corresponding to different transmission resources. It is to be further understood that the beam receiving end cluster allocates the received beams to each beam receiving end in the beam receiving end cluster by the transmission resources corresponding to each beam receiving end.

The beam receiving ends may use multi-access modes as the transmission resources. Different beam receiving ends may be distinguished by the multi-access modes, preventing mutual interference between each beam receiving end.

The multi-access modes may include one or more of time division multiple access (TDMA), frequency division multiple access (FDMA), and code division multiplexing access (CDMA).

In the TDMA mode, a plurality of beam receiving ends are allowed to use a same frequency in different time slices. The beam receiving ends perform transmission quickly, one after another, each using their own time slices.

In the FDMA mode, a frequency band is divided into several channels, and at the same time, a plurality of different address terminals are allowed to use different channels to realize multiple access communication. Only service information of one terminal can be transmitted in a frequency channel at a same time. Alternatively, the channels are classified by carrier frequencies, each channel occupies a carrier frequency, and a transmission bandwidth between adjacent carrier frequencies should meet a requirement.

In the CDMA mode, base stations are distinguished by different pseudo-random codes. CDMA is a technology in which each base station transmits information at a same frequency and at a same time. The pseudo-random codes are superimposed when a signal is sent. Therefore, a spectrum of the signal is greatly widened. Moreover, in the CDMA mode, the beam receiving ends use different and mutually orthogonal address codes to modulate transmitted signals. A corresponding signal is selected from mixed signals by address recognition by using orthogonality of a code pattern at the beam receiving end.

In the present disclosure, the multi-access modes will be described in conjunction with embodiments.

If the TDMA mode is adopted at the beam receiving ends, slot1 serves a beam receiving end 1, and slot2 serves a beam receiving end 2. TDMA modes at the other beam receiving ends are deduced by analogy. If the FDMA mode is adopted, data of FDMA 1 is carried on a carrier frequency f1, and a service of FDMA 2 is carried on a carrier frequency f2. FDMA modes at the other beam receiving ends are deduced by analogy. The distinguishing of the beam receiving ends in the multi-access modes ensures that each beam receiving end corresponds to a different transmission resource, preventing mutual interference of signals between each beam receiving end.

In an example, the beam receiving end cluster is a terminal cluster. Determined by geographical positions, terminals under a coverage angle of the satellite belong to a same terminal cluster. The terminals in the same terminal cluster use orthogonal pilot sequences. When a DoA aligned with the terminal cluster is determined, on the one hand, the satellite determines a beamforming weighting factor of a downlink according to statistics on channels of uplinks of a plurality of terminals.

For pilot sequences in a same terminal cluster, a reference pilot sequence may be designed according to a number of clusters. The pilot sequence of each terminal in a terminal cluster is obtained by cyclic shift according to the reference pilot sequence.

An actual beamforming factor in the terminal cluster is obtained according to statistics on conditions of channels of uplinks of the terminals in the cluster.

In the embodiment of the present disclosure, the statistics on conditions of channels of uplinks of the terminals may be obtained according to the pilot sequences. That is, channel information is obtained by dividing a received pilot sequence by the known pilot sequence, channels are processed to obtain a DoA, and then a beamforming factor is obtained.

In another example of the embodiment of the present disclosure, each terminal in the terminal cluster feeds a received DoA of the downlink back to the uplink to assist the satellite in determining an antenna array to respond. The satellite also needs to take a movement speed, a relative position, and the like into account. For example, there is a time difference between the process of obtaining H and calculating an angle by the satellite and subsequent signal sending. In this process, due to changes in the movement speed and the attitude of the satellite, an offset exists between an actual required beamforming factor and a calculated factor. Therefore, there is a need to superpose the above factors to cause an angle between the satellite and the terminal cluster to change.

In the embodiment of the present disclosure, within the coverage area of the satellite, the beam is kept always aligned with the terminal cluster, and the terminals in the cluster distinguish the transmission resources by time domains, and/or airspace, and/or code domains, or the like. In an example, in the terminal cluster, the terminals distinguish the transmission resources by TDMA/FDMA/CDMA and other multi-access modes to prevent interference between users. If the TDMA mode is adopted, slot1 serves a user 1, and slot2 serves a user 2. If the FDMA mode is adopted, data of the user 1 is carried on a carrier frequency f1, and a service of the user 2 is carried on a carrier frequency f2.

With the communication method according to the embodiment of the present disclosure, the coverage area of the satellite is determined based on the movement speed of the satellite and the attitude of the satellite. The DoA is adjusted for a specified beam receiving end or beam receiving end cluster to determine a DoA aligned with the specified beam receiving end, or to determine a DoA aligned with the specified beam receiving end cluster, which can ensure that the satellite sends a beam in the DoA aligned with the beam receiving end. Moreover, in the embodiment of the present disclosure, for the beam receiving end cluster, each beam receiving end is distinguished by the multi-access modes, which prevents mutual interference of signals between the beam receiving ends and ensures that beams of the satellite are kept always aligned with each beam receiving end in the beam receiving end cluster and that the beams are sent based on DoAs of the satellite aligned with the beam receiving ends. Through the present disclosure, global network coverage can be realized, which prevents the problem that the ground base station cannot provide wireless network services in some remote regions, sea areas or even in the air due to geographical restrictions, and network coverage can be realized without geographical restrictions, which can ensure an effect that the wireless network services can be enjoyed at any position.

Based on the same concept, an embodiment of the present disclosure further provides a communication apparatus.

It may be understood that, in order to realize the above functions, the communication apparatus according to the embodiment of the present disclosure includes hardware structures and/or software modules corresponding to the functions. In combination with the units and algorithm steps of the examples disclosed in the embodiment of the present disclosure, the embodiment of the present disclosure may be implemented in the form of hardware or a combination of hardware and computer software. Whether a certain function is executed by hardware or by computer software driving hardware depends on specific applications and design constraints of the technical solution. Those skilled in the art may use different methods to implement the described functions for each specific application, but it should not be considered that such example goes beyond the scope of the technical solution of the embodiment of the present disclosure.

Figure 3:
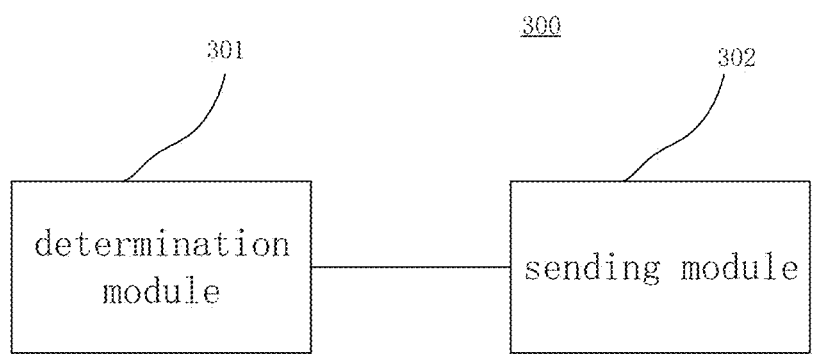
FIG. 3 is a block diagram of a communication apparatus according to an exemplary embodiment.

FIG. 3 is a block diagram of a communication apparatus 300 according to an exemplary embodiment. Referring to FIG. 3, the apparatus includes a determination module 301 and a sending module 302.

The determination module 301 is configured to determine a DoA of a satellite aligned with a beam receiving end. The sending module 302 is configured to send a beam based on the DoA.

In an example, the DoA of the satellite aligned with the beam receiving end is determined based on a first DoA and position offset of the satellite relative to a first position within a specified time; and the first DoA is a DoA of the beam receiving end determined at the first position by the satellite.

In an example, the position offset of the satellite within the specified time is determined based on a movement speed of the satellite and/or an attitude of the satellite.

In an exemplary example of the present disclosure, the first DoA is determined based on a channel state of the beam receiving end.

In an exemplary example of the present disclosure, the first DoA is determined based on a DoA sent by the beam receiving end, the DoA sent by the beam receiving end being a DoA of the satellite received by the beam receiving end.

In an exemplary example of the present disclosure, the channel state is determined based on a pilot sequence of the beam receiving end.

In an exemplary example of the present disclosure, the pilot sequence is a pilot sequence of a specified beam receiving end.

In an exemplary example of the present disclosure, the pilot sequence of the specified beam receiving end is determined based on capacity of the satellite.

In an exemplary example of the present disclosure, the pilot sequence is a pilot sequence of one or more beam receiving end clusters, the beam receiving end clusters each including one or more beam receiving ends.

In an exemplary example of the present disclosure, a pilot sequence of each beam receiving end in the beam receiving end cluster is determined by cyclic shift based on a reference pilot sequence of the beam receiving end cluster.

In an exemplary example of the present disclosure, the pilot sequence of each beam receiving end in the beam receiving end cluster is orthogonal to each other.

In an exemplary example of the present disclosure, the reference pilot sequence of the beam receiving end cluster is determined based on a number of the beam receiving end clusters.

In an exemplary example of the present disclosure, the beam receiving end cluster is determined based on a coverage angle of the satellite.

In an exemplary example of the present disclosure, each beam receiving end in the beam receiving end cluster corresponds to a different transmission resource.

Regarding the apparatuses in the above embodiments, specific manners in which the modules perform operations have been described in the method embodiments, and will not be elaborated herein.

Figure 4:
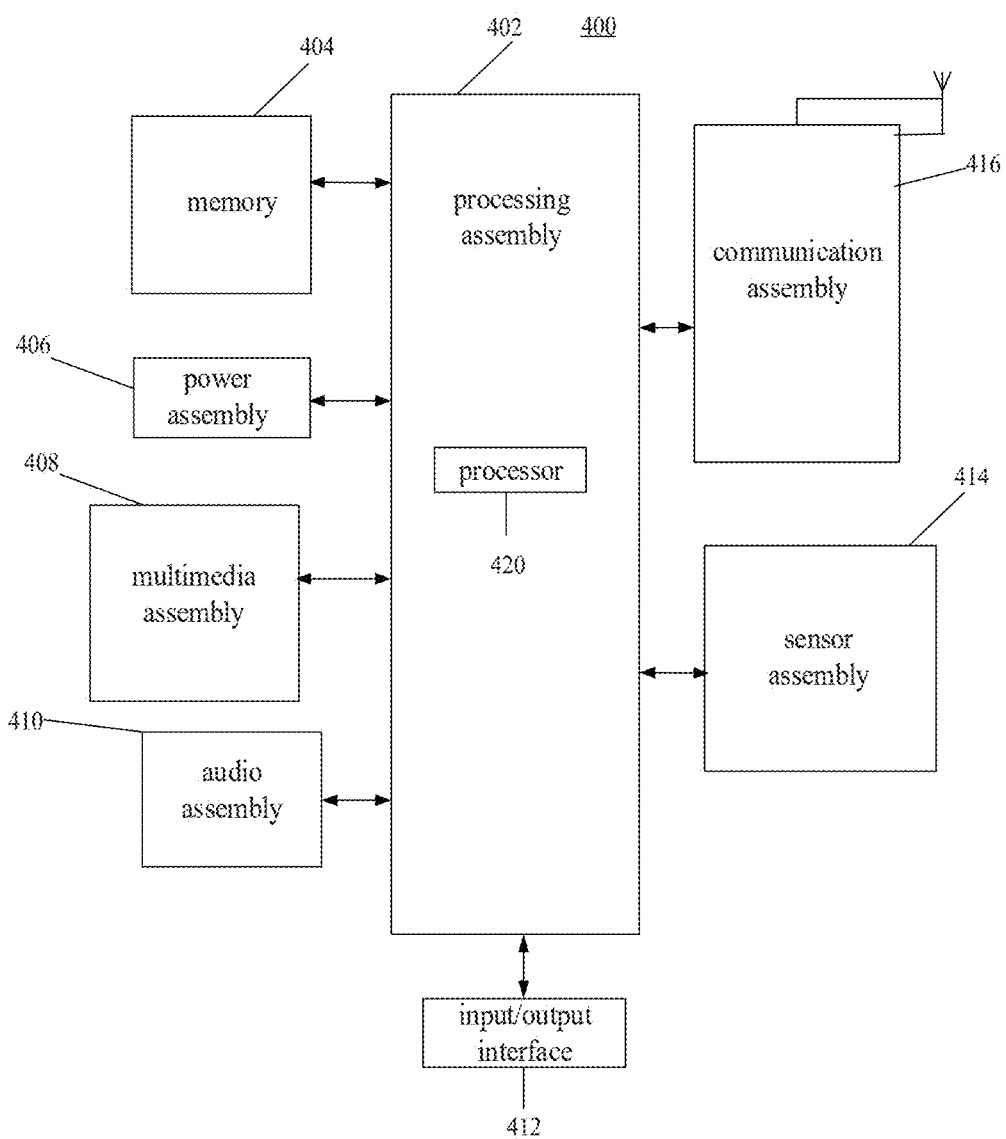
FIG. 4 is a block diagram of a communication apparatus according to an exemplary embodiment.

FIG. 4 is a block diagram of an apparatus 400 for communication according to an exemplary embodiment. For example, the apparatus 400 may be a mobile phone, a computer, a digital broadcast terminal, a message transceiver device, a game console, a tablet device, medical equipment, fitness equipment, a personal digital assistant, or the like.

Referring to FIG. 4, the apparatus 400 may include one or more following assemblies: a processing assembly 402, a memory 404, a power assembly 406, a multimedia assembly 408, an audio assembly 410, an input/output (I/O) interface 412, a sensor assembly 414, and a communication assembly 416.

The processing assembly 402 typically controls overall operations of the apparatus 400, such as operations associated with display, telephone calls, data communications, camera operations, and recording operations. The processing assembly 402 may include one or more processors 420 to execute instructions to perform all or some of the steps in the methods described above. Moreover, the processing assembly 402 may include one or more modules which facilitate interaction between the processing assembly 402 and other assemblies. For example, the processing assembly 402 may include a multimedia module to facilitate interaction between the multimedia assembly 408 and the processing assembly 402.

The memory 404 is configured to store various types of data to support the operation of the apparatus 400. Examples of such data include instructions for any applications or methods operated on the apparatus 400, contact data, phonebook data, messages, pictures, video, etc. The memory 404 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power assembly 406 provides power to various assemblies of the apparatus 400. The power assembly 406 may include a power management system, one or more power sources, and any other assemblies associated with generation, management, and distribution of power in the apparatus 400.

The multimedia assembly 408 includes a screen providing an output interface between the apparatus 400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia assembly 408 includes a front camera and/or a rear camera. The front camera and/or the rear camera may receive external multimedia data while the apparatus 400 is in an operation mode, such as a photographing mode or a video mode. Each of the front camera and the rear camera may be a fixed optical lens system or have a focal length and optical zoom capability.

The audio assembly 410 is configured to output and/or input audio signals. For example, the audio assembly 410 includes a microphone (MIC) configured to receive an external audio signal when the apparatus 400 is in an operation mode, such as a call mode, a recording mode, and a voice recognition mode. The received audio signal may be further stored in the memory 404 or transmitted via the communication assembly 416. In some embodiments, the audio assembly 410 further includes a speaker to output audio signals.

The I/O interface 412 provides an interface between the processing assembly 402 and a peripheral interface module. The peripheral interface module may be a keyboard, a click wheel, buttons, or the like. The buttons may include, but are not limited to, a home button, a volume button, a starting button, and a locking button.

The sensor assembly 414 includes one or more sensors to provide state assessments of various aspects of the apparatus 400. For example, the sensor assembly 414 may detect an on/off state of the apparatus 400 and relative positioning of assemblies. The assemblies may be a display and a keypad of the apparatus 400. The sensor assembly 414 may further detect a change in the position of the apparatus 400 or an assembly of the apparatus 400, presence or absence of the user's contact with the apparatus 400, an orientation or an acceleration/deceleration of the apparatus 400, and a change in temperature of the apparatus 400. The sensor assembly 414 may include a proximity sensor configured to detect the presence of nearby objects without any physical contact. The sensor assembly 414 may also include a light sensor, such as a CMOS or CCD image sensor, for use in imaging applications. In some embodiments, the sensor assembly 414 may also include an accelerometer sensor, a gyroscope sensor, a magnetic sensor, a pressure sensor or a temperature sensor.

The communication assembly 416 is configured to facilitate wired or wireless communication between the apparatus 400 and other devices. The apparatus 400 may access a wireless network based on a communication standard, such as WiFi, 2G or 3G, or a combination thereof. In an exemplary embodiment, the communication assembly 416 receives a broadcast signal or broadcast related information from an external broadcast management system via a broadcast channel In an exemplary embodiment, the communication assembly 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic assemblies, for performing the above methods.

In exemplary embodiments, a non-transitory computer-readable storage medium including instructions is further provided, for example, a memory 404 including instructions. The instructions may be performed by a processor 420 of the apparatus 400 to complete the above method. For example, the non-transitory computer-readable storage medium may be a ROM, a RAM, a CD-ROM, a magnetic tape, a floppy disc, an optical data storage device or the like.

It may be further understood that "a plurality of" in the present disclosure indicates two or more, and other quantifiers are similar thereto. The term "and/or" describes an association relationship for describing associated objects, indicating that three relationships may exist. For example, A and/or B may represent the following three cases: Only A exists, both A and B exist, and only B exists. The character "/" generally indicates that the associated objects before and after are in an "or" relationship. The singular forms "a/an", "one", and "the" are also intended to include plural forms, unless otherwise clearly specified in the context.

It may be further understood that the terms "first", "second", etc. are used to describe various information, but the information should not be limited to these terms. These terms are only used to distinguish the same type of information from each other, and do not indicate a specific order or degree of importance. In fact, expressions such as "first" and "second" may be used interchangeably. For example, without departing from the scope of the present disclosure, the first information may also be referred to as second information, and similarly, the second information may also be referred to as first information.

It may be further understood that, although the operations are described in a specific order in the drawings in the embodiments of the present disclosure, it should not be understood that the operations are required to be performed in the shown specific order or in a serial order, or all the shown operations are required to be performed to get a desired result. In specific circumstances, multitasking and parallel processing may be advantageous.

Those skilled in the art will be aware of other embodiments of the present disclosure after considering the specification and practicing the invention disclosed herein. The present application is intended to cover any variations, uses, or adaptive changes of the present disclosure, which follow the general principles of the present disclosure and include common knowledge or conventional technical means in the technical field not disclosed in the present disclosure. The specification and the embodiments are to be regarded as exemplary only, and the true scope and spirit of the present disclosure are indicated in the following claims.

It may be appreciated that the present disclosure is not limited to the exact construction that has been described above and illustrated in the accompanying drawings, and that various modifications and changes may be made without departing from the scope thereof. The scope of the present disclosure is only limited by the appended claims.

What is claimed is:

1. A communication method, comprising:
   determining a direction of arrival (DoA) of a satellite aligned with a beam receiving end; and
   sending a beam based on the DoA,
   wherein the DoA of the satellite aligned with the beam receiving end is determined based on a first DoA and position offset of the satellite relative to a first position within a specified time, and the first DoA is a DoA of the beam receiving end determined at the first position by the satellite;
   wherein the first DoA is determined based on a channel state of the beam receiving end, and the channel state is determined based on a pilot sequence of the beam receiving end.

2. The communication method according to claim 1, wherein the position offset of the satellite within the specified time is determined based on at least one of a movement speed of the satellite or an attitude of the satellite.

3. The communication method according to claim 1, wherein the first DoA is determined based on a DoA sent by the beam receiving end, the DoA sent by the beam receiving end being a DoA of the satellite received by the beam receiving end.

4. The communication method according to claim 1, wherein the pilot sequence is a pilot sequence of a specified beam receiving end.

5. The communication method according to claim 4, wherein the pilot sequence of the specified beam receiving end is determined based on capacity of the satellite.

6. The communication method according to claim 1, wherein the pilot sequence is a pilot sequence of one or more beam receiving end clusters, the beam receiving end clusters each comprising one or more beam receiving ends.

7. The communication method according to claim 6, wherein a pilot sequence of each beam receiving end in a beam receiving end cluster is determined by cyclic shift based on a reference pilot sequence of the beam receiving end cluster.

8. The communication method according to claim 7, wherein the pilot sequence of each beam receiving end in the beam receiving end cluster is orthogonal to each other.

9. The communication method according to claim 7, wherein the reference pilot sequence of the beam receiving end cluster is determined based on a number of the beam receiving end clusters.

10. The communication method according to claim 6, wherein the beam receiving end cluster is determined based on a coverage angle of the satellite.

11. The communication method according to claim 6, wherein each beam receiving end in the beam receiving end cluster corresponds to a different transmission resource.

12. A communication apparatus, comprising:
a processor; and
a memory storing instructions executable by the processor,
wherein the processor is configured to:
determine a direction of arrival (DoA) of a satellite aligned with a beam receiving end; and
send a beam based on the DoA,
wherein the DoA of the satellite aligned with the beam receiving end is determined based on a first DoA and position offset of the satellite relative to a first position within a specified time, and the first DoA is a DoA of the beam receiving end determined at the first position by the satellite;
wherein the first DoA is determined based on a channel state of the beam receiving end, and the channel state is determined based on a pilot sequence of the beam receiving end.

13. The communication apparatus according to claim 12, wherein the first DoA is determined based on a DoA sent by the beam receiving end, the DoA sent by the beam receiving end being a DoA of the satellite received by the beam receiving end.

14. A non-transitory computer-readable storage medium having stored therein instructions that, when executed by a processor of a mobile terminal, cause the mobile terminal to perform:
determining a direction of arrival (DoA) of a satellite aligned with a beam receiving end; and
sending a beam based on the DoA,
wherein the DoA of the satellite aligned with the beam receiving end is determined based on a first DoA and position offset of the satellite relative to a first position within a specified time, and the first DoA is a DoA of the beam receiving end determined at the first position by the satellite;
wherein the first DoA is determined based on a channel state of the beam receiving end, and the channel state is determined based on a pilot sequence of the beam receiving end.

* * * * *